(12) United States Patent
Omata

(10) Patent No.: US 10,728,286 B2
(45) Date of Patent: Jul. 28, 2020

(54) INFORMATION PROCESSING APPARATUS, INFORMATION PROCESSING METHOD, AND STORAGE MEDIUM STORING PROGRAM

(71) Applicant: CANON KABUSHIKI KAISHA, Tokyo (JP)

(72) Inventor: Jun Omata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 15/286,813

(22) Filed: Oct. 6, 2016

(65) Prior Publication Data

US 2017/0111393 A1    Apr. 20, 2017

(30) Foreign Application Priority Data

Oct. 16, 2015    (JP) .................................. 2015-204676

(51) Int. Cl.
  *H04L 29/06*    (2006.01)
  *G06F 21/62*    (2013.01)

(52) U.S. Cl.
  CPC .......... *H04L 63/20* (2013.01); *G06F 21/6245* (2013.01); *H04L 63/102* (2013.01)

(58) Field of Classification Search
  CPC .......... H04L 63/20; H04L 63/00; G06F 21/30
  USPC ...................................................... 713/150
  See application file for complete search history.

(56) References Cited

U.S. PATENT DOCUMENTS

| 8,316,049 | B2* | 11/2012 | Saito | G06F 21/10 707/781 |
| 8,316,237 | B1* | 11/2012 | Felsher | H04L 9/0825 380/282 |
| 9,071,614 | B2* | 6/2015 | Suzuki | G06F 21/604 |
| 9,286,482 | B1* | 3/2016 | Dumont | G06F 21/32 |
| 9,338,326 | B2* | 5/2016 | Yasukawa | H04N 1/44 |
| 9,646,151 | B2* | 5/2017 | Miyakawa | G06F 21/45 |
| 9,843,603 | B2* | 12/2017 | Naik | H04L 41/0856 |
| 9,853,994 | B2* | 12/2017 | Sakakibara | G06F 11/34 |
| 9,930,068 | B2* | 3/2018 | Shimizu | H04L 63/20 |
| 2010/0082687 | A1* | 4/2010 | Saito | G06F 21/10 707/786 |
| 2010/0317420 | A1* | 12/2010 | Hoffberg | G06Q 30/0207 463/1 |

(Continued)

FOREIGN PATENT DOCUMENTS

| JP | 06028128 A | 2/1994 |
| JP | 2004-094401 A | 3/2004 |

(Continued)

OTHER PUBLICATIONS

Japanese Office Action issued in corresponding Japanese Application No. 2015204676 dated Sep. 13, 2019.

*Primary Examiner* — Lynn D Feild
*Assistant Examiner* — Viral S Lakhia
(74) *Attorney, Agent, or Firm* — Venable LLP

(57) ABSTRACT

In accordance with a security policy regarding a setting value of an information processing apparatus, restriction information indicating whether to restrict modification of the setting value of information processing apparatus stored in a first storage unit is generated and stored in a second storage unit different to the first storage unit. Based on the restriction information stored in the second storage unit, modification of the setting value of the information processing apparatus is restricted.

9 Claims, 6 Drawing Sheets

(56) References Cited

U.S. PATENT DOCUMENTS

| | | | | |
|---|---|---|---|---|
| 2013/0063761 A1* | 3/2013 | Uchibori | ............... | G06F 3/1285 |
| | | | | 358/1.14 |
| 2014/0029039 A1* | 1/2014 | Deter | ..................... | G06F 21/45 |
| | | | | 358/1.14 |
| 2014/0108649 A1* | 4/2014 | Barton | ................ | G06F 9/45533 |
| | | | | 709/224 |
| 2014/0108670 A1* | 4/2014 | Naik | ................... | H04L 41/0856 |
| | | | | 709/229 |
| 2015/0092252 A1* | 4/2015 | Kwak | ................ | H04N 1/00925 |
| | | | | 358/474 |
| 2015/0106958 A1* | 4/2015 | Holman | .................. | G06F 21/64 |
| | | | | 726/32 |
| 2015/0264088 A1* | 9/2015 | Shimizu | ................. | H04L 63/20 |
| | | | | 726/1 |
| 2015/0293726 A1* | 10/2015 | Tsuchitoi | ............. | G06F 3/1222 |
| | | | | 358/1.14 |

FOREIGN PATENT DOCUMENTS

| | | | |
|---|---|---|---|
| JP | 2012190337 A | 10/2012 | |
| JP | 2015176487 A | 10/2015 | |

\* cited by examiner

INFORMATION PROCESSING APPARATUS, INFORMATION PROCESSING METHOD, AND STORAGE MEDIUM STORING PROGRAM

BACKGROUND OF THE INVENTION

Field of the Invention

The present invention relates to an information processing apparatus that processes information relating to a security policy, an information processing method, and a storage medium storing a program.

Description of the Related Art

In recent years, in usage of a digitized document, the possibility of a problem of leakage of the electronic document occurring is increasing. It is desirable for a server device or a personal computer (PC) connected to a network for an office or the like to operate in accordance with an information security policy determined for each office. An information security policy is a basic strategy relating to information security for a company overall, and consolidates the strategy for using information and preventing an intrusion from the outside and information leakage.

As devices connected to a network for an office or the like, there are peripheral apparatuses such as multifunction peripherals, in addition to PCs and server devices. As functions of a multifunction peripheral in recent years, there are those that have functions of storing image data in the multifunction peripheral and providing a file service to a PC, in addition to transmitting or printing an image. Complying with an information security policy similarly to a server device is also required for such a multifunction peripheral.

When a security policy is set, specific setting values relating to the security policy are fixed values, and writing by editing or the like is restricted. In such a case, information for restricting writing is saved internally. In accordance with such information for restricting writing, even if a user tries to edit a setting value for which writing is restricted by the security policy, a writing operation is prohibited.

An image forming apparatus for which ROM capacity is high, such as a sophisticated image forming apparatus, saves the information for restricting writing in the ROM. At a time of activation, the information for restricting writing is read from the ROM, and it is determined whether writing is restricted for a specific setting value. However, in an image forming apparatus such as a low-price model, because ROM capacity is not sufficient, there is a need to reduce as much as possible information that is saved in the ROM. In addition, if information for restricting writing is saved in the ROM, the ROM capacity will be pressed. To solve such a problem, an apparatus needing a security policy at activation time actively obtains the security policy from a management apparatus at activation time. Using an obtained security policy to perform access control (writing control) has been proposed (Japanese Patent Laid-Open No. 2004-94401).

However, in the method of Japanese Patent Laid-Open No. 2004-94401, even if it becomes possible to reduce data saved in the ROM, access to a management server at activation time becomes necessary each time. For example, a management server becomes necessary for a low-price model image forming apparatus, and extra cost is incurred.

SUMMARY OF THE INVENTION

An aspect of the present invention is to eliminate the above-mentioned problems with the conventional technology. The present invention provides an information processing apparatus, an information processing method, and a storage medium storing a program for preventing an increase of data in a memory and also easily realizing a configuration for restricting modification of a setting value of apparatus information in accordance with a security policy.

The present invention in one aspect provides an information processing apparatus, comprising: a first storage unit configured to store a setting value relating to the information processing apparatus and a security policy for the setting value; a generation unit configured to generate restriction information indicating whether to restrict modification of the setting value relating to the information processing apparatus stored in the first storage unit in accordance with the security policy; a storing unit configured to store the restriction information generated by the generation unit in a second storage unit different to the first storage unit; and a restricting unit configured to restrict modification of the setting value relating to the information processing apparatus based on the restriction information stored in the second storage unit by the storing unit, wherein at least one of the generation unit, the storing unit, and the restricting unit is implemented by a processor and a memory.

By the present invention, it is possible to prevent an increase of data in a memory and also easily realize a configuration for restricting modification of a setting value of apparatus information in accordance with a security policy.

Further features of the present invention will become apparent from the following description of exemplary embodiments with reference to the attached drawings.

DESCRIPTION OF THE EMBODIMENTS

Figure 1:
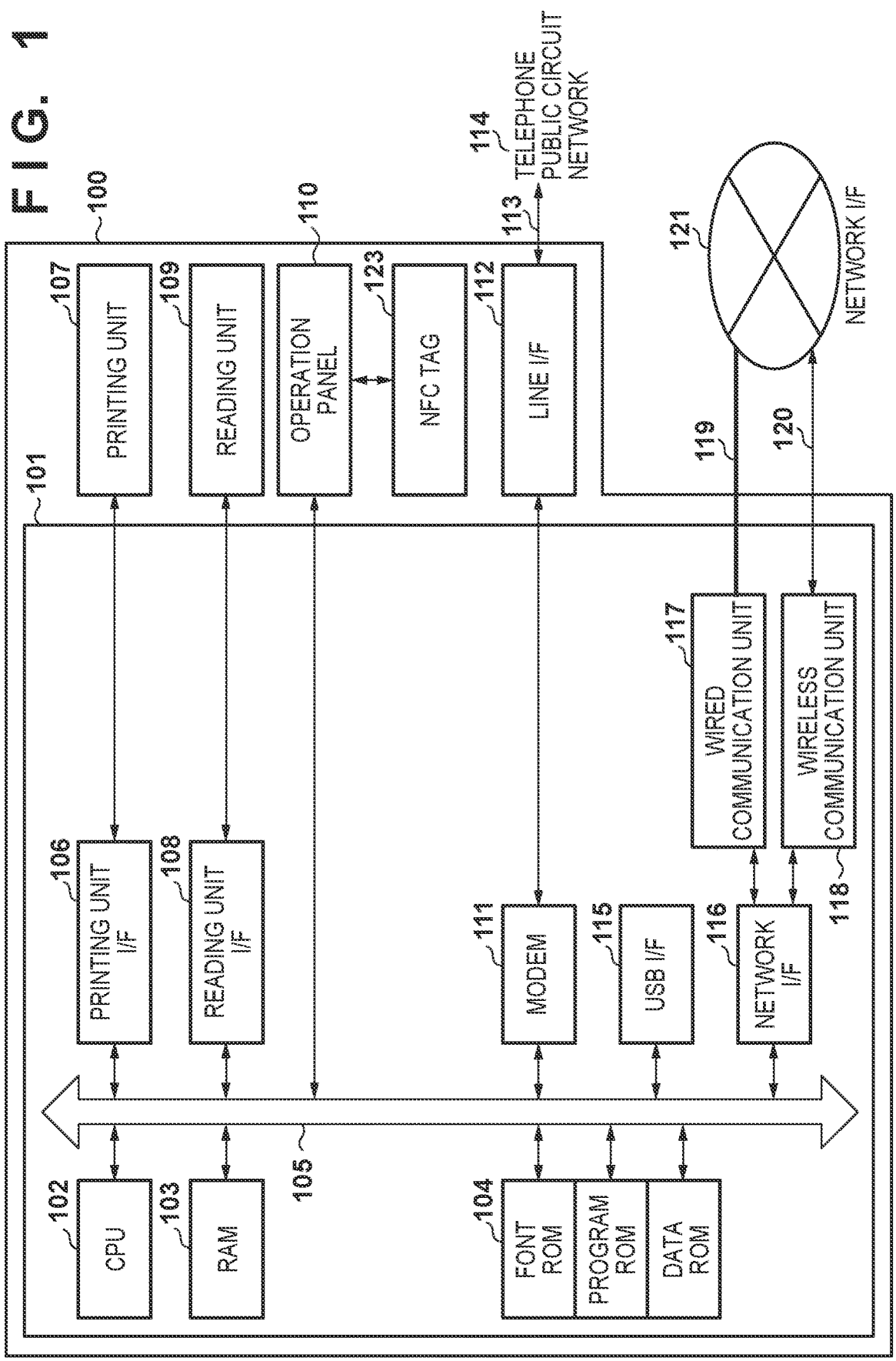
FIG. 1 is a block diagram illustrating a hardware configuration of an image forming apparatus.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

FIG. 1 is a block diagram illustrating a hardware configuration of an image forming apparatus in the present embodiment. Each block illustrates a module, and arrows between blocks illustrate a flow of data or instructions. In the present embodiment, an image forming apparatus 100 is a so-called MFP (Multi Function Peripheral) that unifies a plurality of functions, including image forming functions such as a print function and a scan function (reading function), for example. However, it may be an apparatus of a form other than an MFP if it is an information processing apparatus that requires a security policy for setting values related to apparatus information.

An MFP 100 is configured by including a printing unit 107, a reading unit 109, an operation panel 110, a line interface (I/F) 112, and a control unit 101 that controls these.

The control unit 101 includes a CPU 102, a RAM 103 that is a volatile memory, a ROM 104 that is a non-volatile memory, a printing unit I/F 106, a reading unit I/F 108, a MODEM 111, a USB I/F 115, and a network I/F 116. In addition, each of the above blocks are connected to be mutually communicable via a system bus 105. In accordance with various control programs, the CPU 102 comprehensively controls each block above, and executes each function that the MFP 100 can execute. For example, an operation of the present embodiment is realized by the CPU 102 reading a program stored in a program region of the ROM 104 into the RAM 103, and executing it. Alternatively, there are cases in which the CPU 102 loads and decompresses compressed data stored in the program region of the ROM 104 into the RAM 103, and executes it. In addition, the various programs may be stored in a compressed state/non-compressed state in a hard disk drive (HDD) (not shown).

The network I/F 116 communicates with an external network 121 via a wired communication unit 117 or a wireless communication unit 118, and communicates by a wired network 119 or wireless network 120 with an external PC or a security policy management server (hereinafter referred to simply as a server). The MODEM 111 connects to a telephone public circuit network 114 via the line interface 112, and performs communication with, for example, a telephone device, a facsimile apparatus, or another image forming apparatus (not shown). The line interface 112 and the telephone public circuit network 114 are connected via a telephone line 113, for example.

The printing unit I/F 106 is an interface for outputting an image signal for printing to the printing unit 107 (print engine). The printing unit 107 has a configuration that supports each printing method, such as an ink-jet printing method or an electrophotographic method. The reading unit I/F 108 is an interface for inputting a read image signal from the reading unit 109 (scan engine) that optically reads an original fed from an ADF (automatic original feeding unit) or an original arranged on an original platen (not shown). At a time of execution of a copy function of the MFP 100, the CPU 102 processes an image signal input from the reading unit I/F 109, converts it to a print image signal, and outputs to the printing unit I/F 106.

Figure 3:
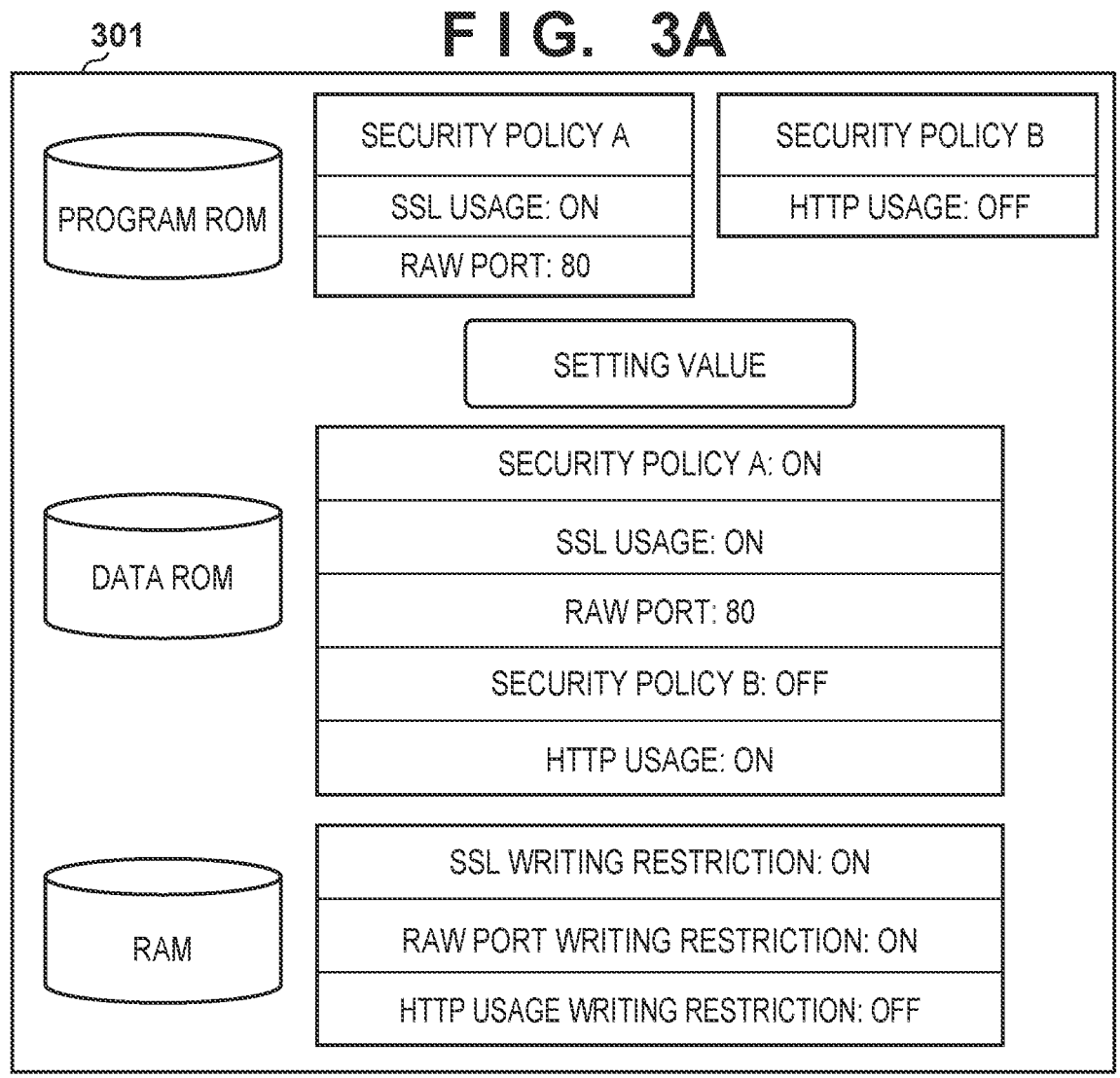
FIG. 3A and FIG. 3B are views illustrating information saved by the ROM and a RAM.

The CPU 102 comprehensively controls the MFP 100 overall. For example, the CPU 102 uses font information stored in a font region of the ROM 104 (a font ROM) to cause text or symbols to be displayed on a display unit of the operation panel 110, and accepts instruction information by a user touch operation on the operation panel 110. The operation panel 110 displays a setting screen for each function the MFP 100 can execute, and user interface screens, such as status information for the apparatus or jobs. In addition, a setting screen for apparatus information such as illustrated in FIG. 3B is displayed in the operation panel 110.

A data region of the ROM 104 (a data ROM) stores apparatus information of the MFP 100, user telephone directory information, department management information, information relating to a security policy, or the like, and this is read as necessary by the CPU 102. In addition, in the present embodiment, information relating to a security policy is also stored in the RAM 103 and not only the ROM 104. The CPU 102 performs control to accept a modify/edit operation for information relating to the security policy, based on information stored in the ROM 104 and the RAM 103.

An NFC tag 123 detects that a mobile terminal or the like is neighboring by short distance wireless communication (Near Field Communication). For example, if a user causes a mobile terminal to be neighboring the NFC tag 123 and selects image data that is a print target, the operation panel 110 accepts that selection information, and the CPU 102 controls the printing unit 107 to print the image.

Figure 2:
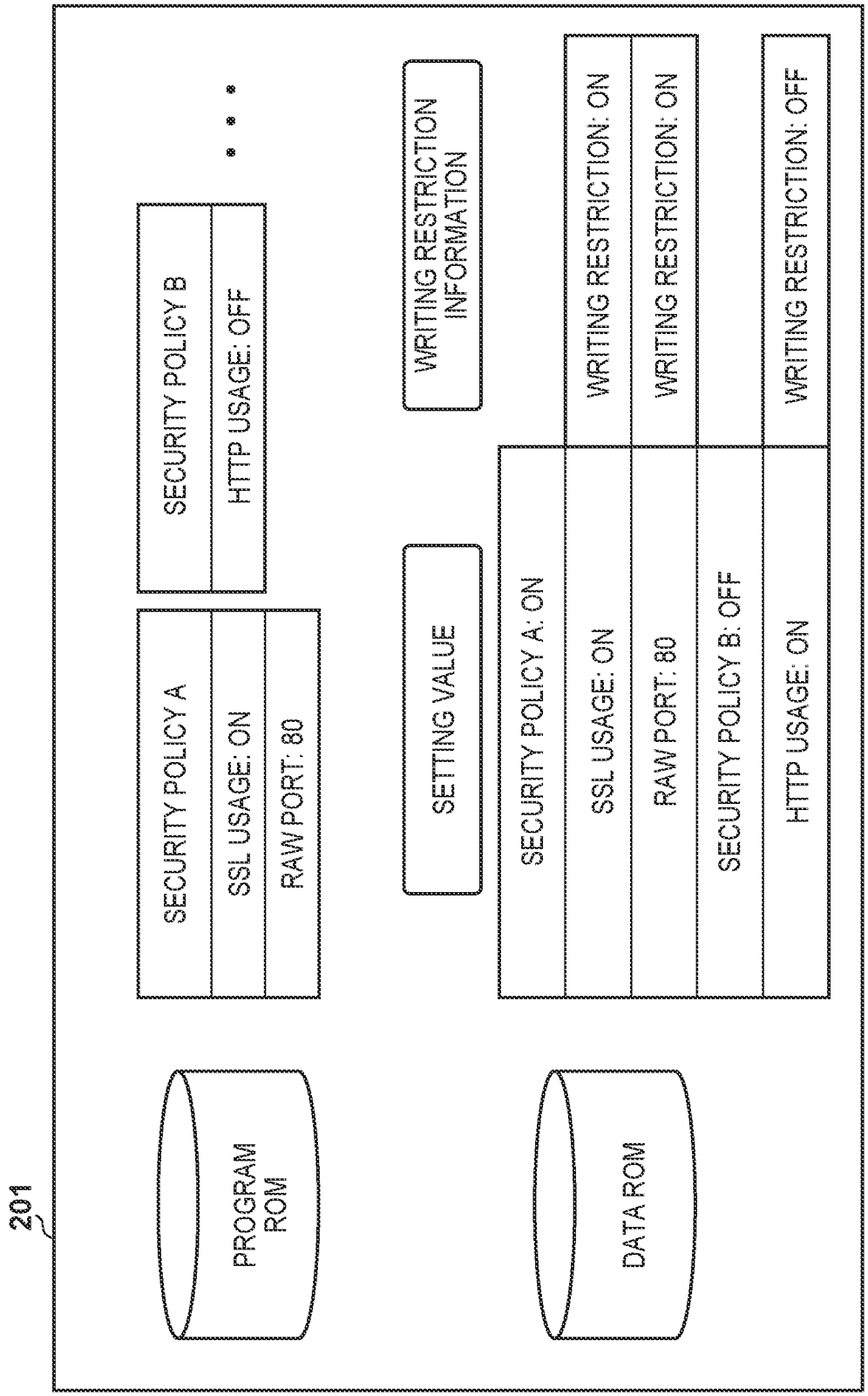
FIG. 2 is a view illustrating information saved by a ROM.

FIG. 2 is a figure illustrating an example of information saved by the ROM 104 conventionally. Saved information 201 illustrates an example of a security policy and information related thereto that are saved in the ROM 104 conventionally.

The program region of the ROM 104 saves a table relating to the security policy. For example, in a table relating to a security policy called security policy A, if the security policy A is enabled, information that usage of SSL must be ON and a port used for raw data must be set to 80 is saved. In addition, in a table relating to a security policy called security policy B, if the security policy B is enabled, information that usage of HTTP must be OFF is saved.

The data region of the ROM 104 saves apparatus information, writing restriction information for each item of the apparatus information, and information relating to the security policy. In FIG. 2, information of "security policy A: ON" and "security policy B: OFF" is information relating to the security policy. In addition, "SSL usage: ON", "RAW port: 80", and "HTTP usage: ON" is apparatus information. In addition, "writing restriction: ON" and "writing restriction: OFF" is writing restriction information.

In FIG. 2, the security policy A is enabled by the ON setting, and the security policy B is disabled by the OFF setting. In FIG. 2, although the security policies A and B are illustrated as though they are associated with each piece of apparatus information, information relating to a security policy and the apparatus information may be configured to be saved independently to each other.

As illustrated in FIG. 2, the setting value for SSL usage stored in the program region is ON, and the setting value for the port to use for raw data is 80. Because the security policy A is enabled, the writing restriction information is saved as an ON setting for the setting value for SSL usage and the setting value for the port to be used for raw data. In addition, because the security policy B is disabled, writing restriction information is saved as the OFF setting for the setting value for HTTP usage. If the writing restriction information is the OFF setting, a user can modify/edit the setting value to any value, and if the writing restriction information is the ON setting, modifying/editing of a setting value is prohibited.

In this way, conventionally writing restriction information for the setting value of each item relating to the security policy is stored in a non-volatile ROM along with the apparatus information and information relating to the security policy, and modify/edit restrictions for setting values are performed based on the writing restriction information. However, if writing restriction information is saved for setting values of all items, for example when a number of items is 5000, capacity of 1 byte×5000=5 KB becomes necessary. This can become a cause of pressing a memory capacity if only 64 KB is reserved as the capacity of the data region of the ROM 104, for example.

FIG. 3A is a view illustrating an example of information saved by the ROM 104 and the RAM 103 in the present embodiment. Saved information 301 illustrates an example of a security policy and information related thereto that are saved in the RAM 103 and the ROM 104 in the present embodiment.

The program region of the ROM 104 saves a table relating to the security policy. This is the same as information saved in the program region of the ROM 104 in FIG. 2.

The data region of the ROM 104 saves apparatus information and information relating to the security policy. This is the same as information saved in the data region of the ROM 104 in FIG. 2. However, differing to FIG. 2, the data region of the ROM 104 does not save writing restriction information for each item of the apparatus information.

In the present embodiment, the writing restriction information is saved in the RAM 103, which is a different storage unit to the ROM 104. In the present embodiment, because the security policy A is enabled, the writing restriction information for the setting value for SSL usage and the setting value for the port to be used for raw data is saved in the RAM 103 as an ON setting. In addition, because the security policy B is disabled, writing restriction information for the setting value for HTTP usage is saved in the RAM 103 as an OFF setting.

FIG. 3B is a view illustrating an example of an apparatus information setting screen that is displayed on the operation panel 110. The setting screen of FIG. 3B can be displayed from the main menu screen of the MFP 100, for example, and the CPU 102 displays display content of the setting screen of FIG. 3B based on the apparatus information saved in a data region of FIG. 3A. In addition, the CPU 102 controls whether or not to accept a setting/edit operation for each item of the setting screen of FIG. 3B based on the writing restriction information saved in the RAM 103 of FIG. 3A.

In the present embodiment, it is possible to prevent an increase to the data region with respect to the ROM 104 by having a memory configuration as illustrated in FIG. 3A at an activation time of the MFP 100. Explanation is given below regarding operation of the MFP 100.

Figure 4:
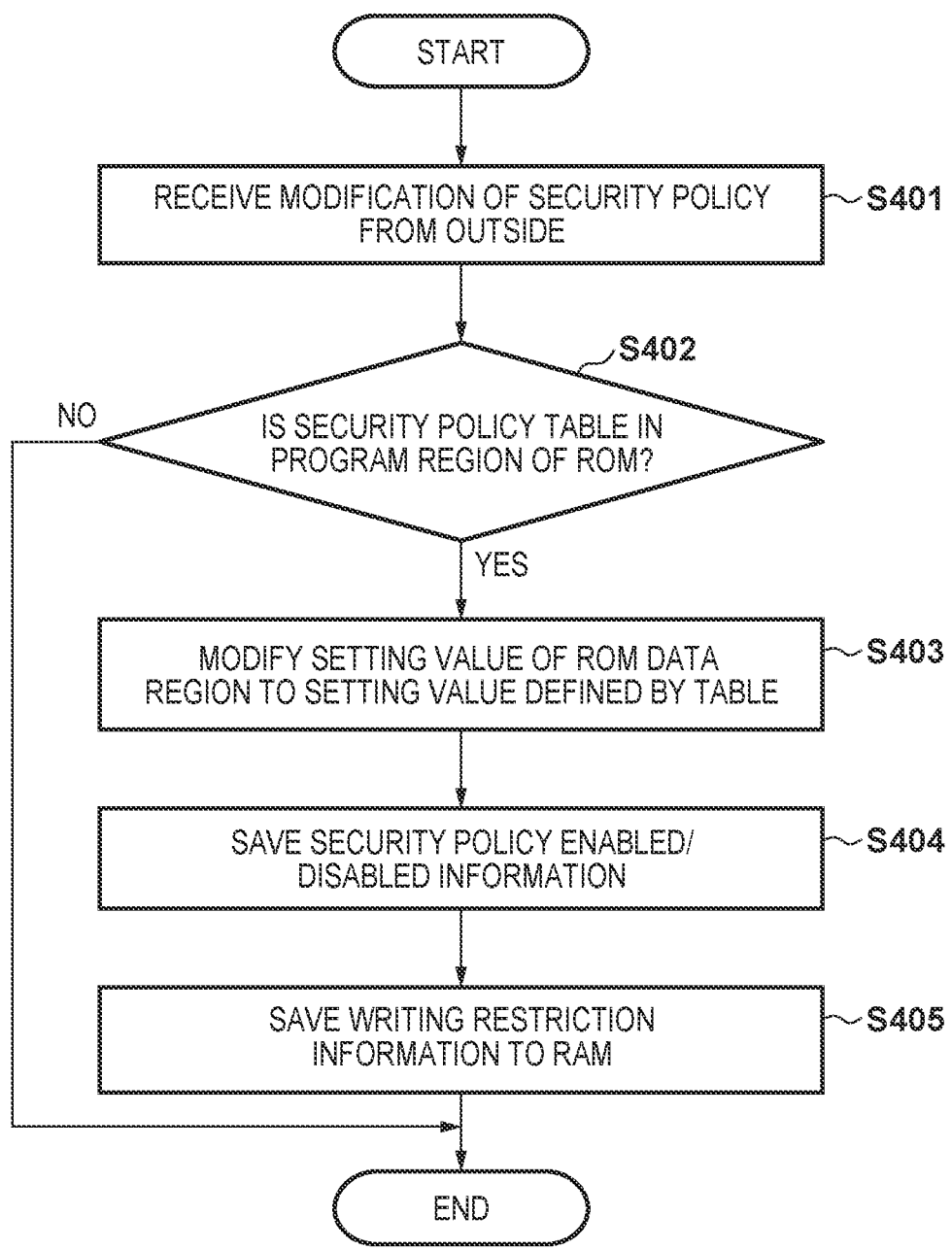
FIG. 4 is a flowchart illustrating processing at a time of detecting a modification of a security policy.

FIG. 4 is a flowchart illustrating processing when the MFP 100 detects a modification of a security policy. Each process of FIG. 4 is realized by the CPU 102 of the MFP 100, for example, reading a program stored in the ROM 104 into the RAM 103 and executing it.

In step S401, the CPU 102 receives, via the network 121, a notification of a security policy modification from a server or a PC. The detail of the notification is, for example, something that includes a type of the security policy (A or B), as well as an item and a setting value (SSL usage: ON, or the like). In addition, the reception in step S401 may be a configuration of receiving notification of a modification from a PC or server that manages the security policy when the security policy is modified, or may be a configuration in which the MFP 100 receives by periodically querying a server or a PC, for example.

In step S402, the CPU 102 determines whether a table for the security policy for which the modification notification was received in step S401 is present in the program region of the ROM 104. If it is determined here that a table for the security policy for which the modification notification was received is present, the processing proceeds to step S403. However, if it is determined here that a table for the security policy for which the modification notification was received is not present, the processing of FIG. 4 terminates. In such a case, configuration may be taken such that the CPU 102 newly configures a table for the security policy for which a notification was received in the program region of the ROM 104.

In step S403, the CPU 102 updates the table for the security policy for which notification of a modification was received based on modification details received in step S401. The CPU 102 reads items and setting values for the security policy from the updated security policy table. Furthermore, the CPU 102 modifies, from the items of the apparatus information stored in the data region of the ROM 104, the setting value corresponding to the item read above with the setting value read above.

In step S404, the CPU 102 saves information of enabled/disabled for the security policy for which a modification notification was received in the data region of the ROM 104. This corresponds to information for "security policy A: ON" or "security policy B: OFF" in the data region of the ROM 104 in FIG. 3. Information for enabled or disabled may be included in information transmitted from an external server or a PC, or can also be set in the MFP 100.

In step S405, the CPU 102 sets, in accordance with the enabled/disabled information for the security policy for which a modification notification was received, the writing restriction information for the setting values of the apparatus information saved in the RAM 103. That is, if the security policy for which a modification notification is received is set to enabled, the CPU 102 sets the writing restriction information in the RAM 103 to ON (enabled). However, if the security policy for which a modification notification is received is set to disabled, the CPU 102 sets the writing restriction information for the setting value of the apparatus information saved in the RAM 103 to OFF (disabled).

Regarding an item for which the writing restriction information is set to ON, a user cannot modify or edit the setting value. In contrast, regarding an item for which the writing restriction information is set to OFF, a user can modify or edit the setting value.

As described above, if the CPU 102 detects a modification of the security policy, it updates the setting content of the writing restriction information in the RAM 103 to accompany the modification. As a result, when display of the setting screen of FIG. 3B is instructed from a user, even if a modification of the security policy is detected, it is possible to appropriately reflect that modification in real time to display control for whether or not accepting is permitted for a modify/edit operation to the setting screen.

Figure 5:
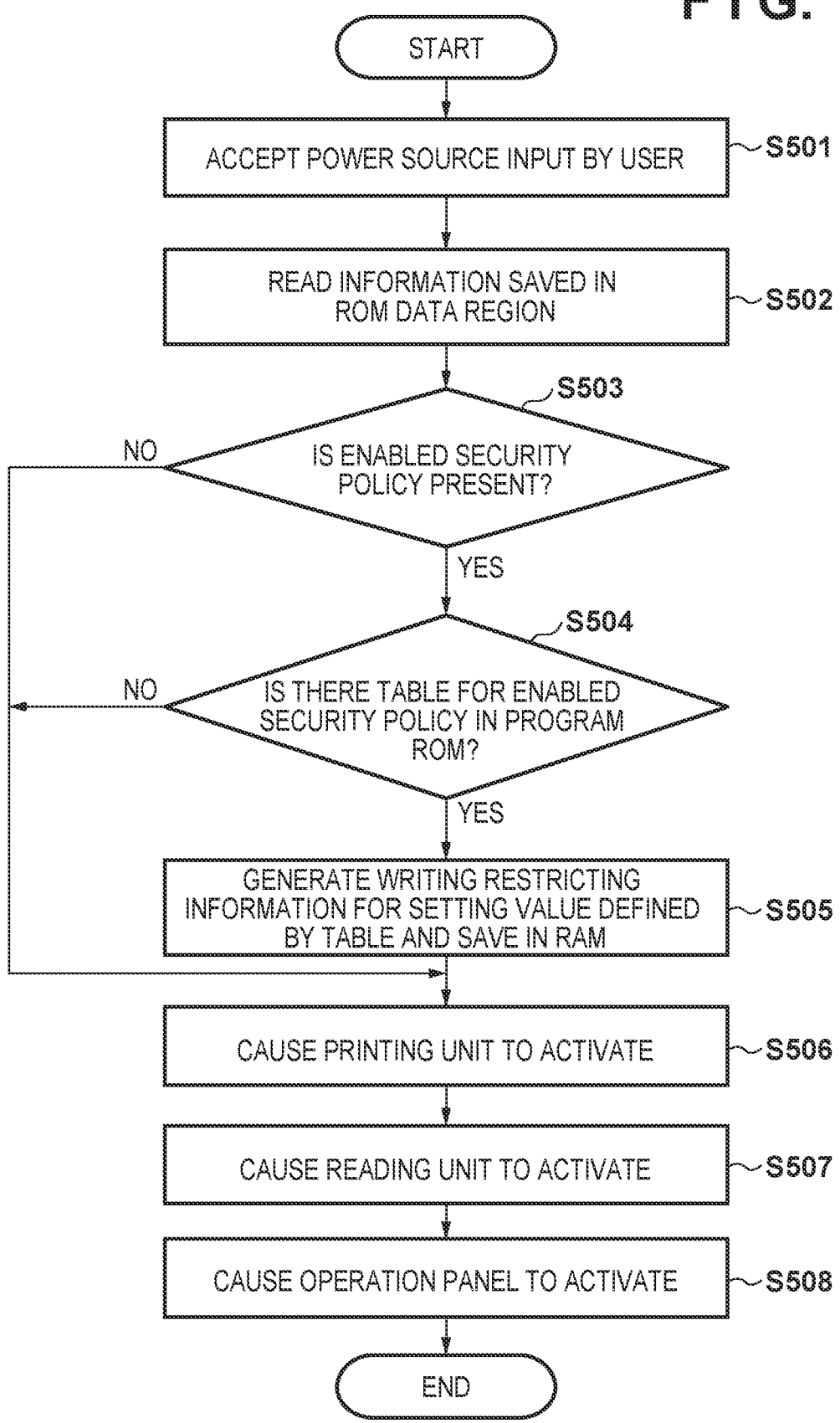
FIG. 5 is a flowchart illustrating processing performed at an activation time of an MFP.

FIG. 5 is a flowchart illustrating processing performed at an activation time of the MFP 100 according to the present embodiment. Each process depicted in FIG. 5 is realized by the CPU 102, for example, reading a program stored in the ROM 104 into the RAM 103 and executing it.

In step S501, when a power source of the MFP 100 is input by a user operation, the CPU 102 executes activation processing saved in the program region of the ROM 104.

In step S502, the CPU 102 reads information saved in the data region of the ROM 104. Note that, configuration may be taken such that the CPU 102 saves the read information in the RAM 103 at this time.

In step S503, the CPU 102 determines whether information of a security policy set to "enabled" is present in the data region information read in step S502. A security policy set to "enabled" is, for example, "security policy A: ON" of the data region of FIG. 3. If it is determined here that information for the security policy set to "enabled" is present, the processing proceeds to step S504. However, if it is determined that there is no information for a security policy set to "enabled", the processing proceeds to step S506.

In step S504, the CPU 102 determines whether a table corresponding to the security policy determined in step S503 to be set to "enabled" is present in the program region of the ROM 104. Here, if present is determined the processing proceeds to step S505, and if not present is determined the processing proceeds to step S506. Configuration may be taken such that, if not present is determined in step S504, because there is a possibility that the security policy table in the program region has been deleted by an administrator or the like, for example information related to the security policy in the data region is deleted and made consistent with the content of the program region.

In step S505, the CPU 102 generates writing restriction information for the setting values of each item included in the security policy table set to "enabled", sets it to ON (enabled), and stores it in the RAM 103. In addition, the CPU 102 generates writing restriction information for the setting values of each item included in other security policy tables, sets it to OFF (disabled), and saves it in the RAM 103. In step S505, when generation and setting of writing restriction information for each item of all security policies is performed, the processing proceeds to step S506.

In step S506, the CPU 102 performs activation processing for the printing unit 107 via the printing unit I/F 106. In step S506, activation processing in accordance with the printing method is performed, such as nozzle drive processing for discharge preparation of an inkjet printhead, for example. In step S507, the CPU 102 performs activation processing for the reading unit 109 via the reading unit I/F 108. In step S507, for example activation processing of a read head that includes a light source or an image sensor is performed. In step S508, the CPU 102 performs activation processing of the operation panel 110. In step S508, for example warm-up processing of a panel and display of a main menu screen of the MFP 100 are performed. Note that each processing of step S506, step S507, and step S508 may be executed after changing the order, or may be performed in parallel.

As described above, in the present embodiment, at the activation time of the MFP 100 the CPU 102, based on the security policy table saved in the ROM 104, generates writing restriction information for the setting value of each item of the apparatus information, and saves it in the storage region of the RAM 103. By this, it is possible to suppress an increase of a data amount stored in the ROM 104. In addition, in the present embodiment the writing restriction information of the setting value of each item of apparatus information is saved in a region of the RAM 103, but configuration may be taken to not save to the RAM 103 if saving to a memory different to a memory for storing information other than the writing restriction information out of the saved information 301 illustrated in FIG. 3.

Figure 6:
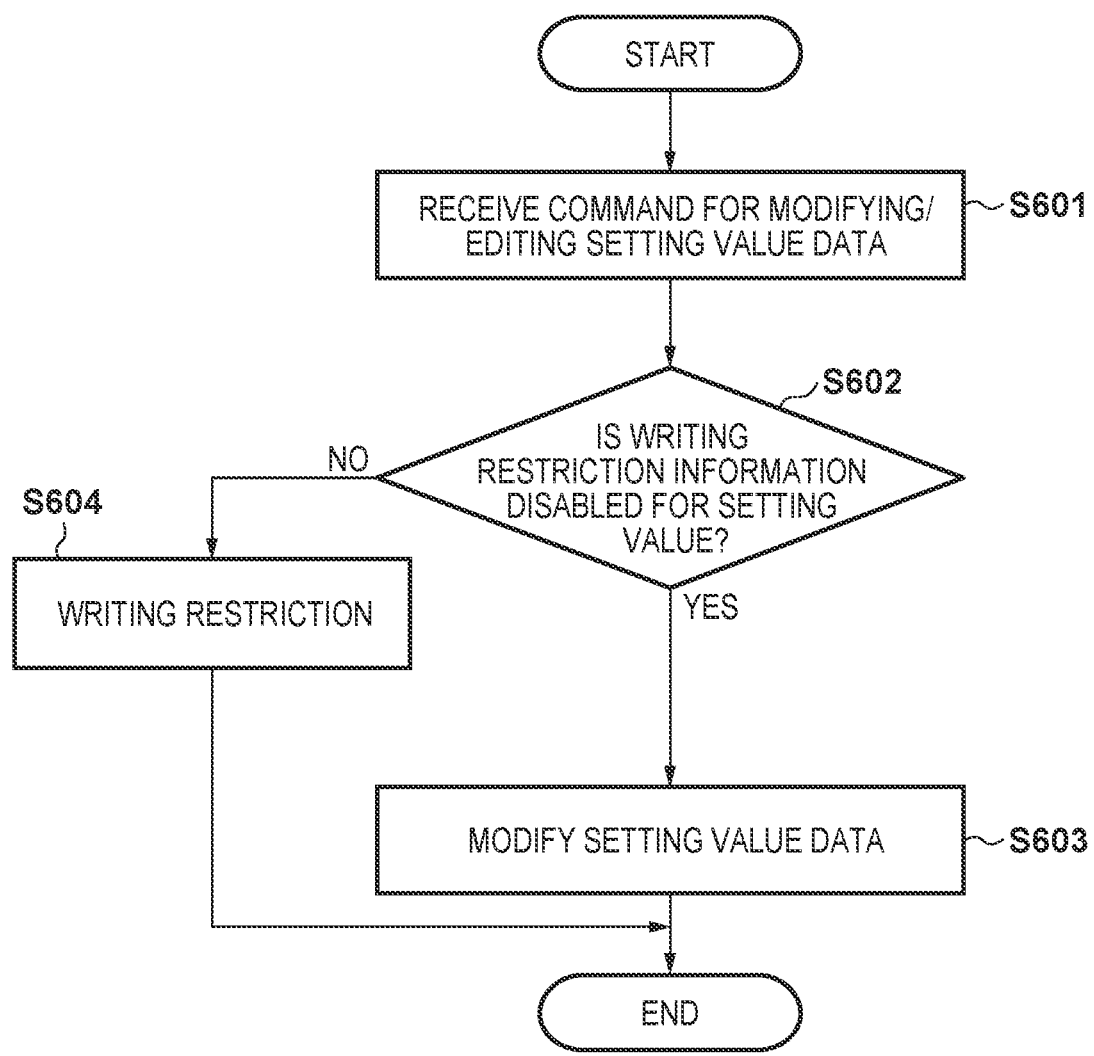
FIG. 6 is a flowchart illustrating processing at a time of accepting a modify/edit operation for apparatus information.

FIG. 6 is a flowchart illustrating processing at a time of accepting a modify/edit operation for apparatus information in the present embodiment. Each process depicted in FIG. 6 is realized by the CPU 102, for example, reading a program stored in the ROM 104 into the RAM 103 and executing it.

Here, at a time of executing the processing of FIG. 6, a setting screen for the apparatus information illustrated in FIG. 3B is displayed on the operation panel 110. The setting screen of FIG. 3B can be displayed from the main menu screen of the MFP 100, for example. In the setting screen of FIG. 3B, for items having no modify/edit restriction it is possible to accept setting of any value by an input operation or a menu button operation or the like by a user.

In step S601, the CPU 102 receives a command for modifying/editing a setting value of the apparatus information. A modify/edit command for apparatus information, for example, may be a user operation accepted in the operation panel 110, or may be a modify/edit instruction received from outside via the network 121.

In step S602, the CPU 102 refers to the writing restriction information, saved in the RAM 103, of the setting value for the item that is a target of the modify/edit command, and determines whether it is set to ON (enabled) or set to OFF (disabled). Here, if it is determined that OFF is set, the processing proceeds to step S603 because the setting value can be modified/edited. However, if it is determined that ON is set, the processing proceeds to step S604 because the setting value cannot be modified/edited. In step S604, the CPU 102 displays a warning screen indicating to the effect that modifying/editing of the setting value is prohibited on the operation panel 110. The warning screen, for example, may be displayed as a pop-up on the setting screen of FIG. 3B, or may be of a format in which a warning mark is displayed for an item for which a modify/edit operation was attempted. Meanwhile, in step S603 the CPU 102 modifies/edits the setting value of the apparatus information in the ROM 104 in accordance with the modify/edit command, and the processing of FIG. 6 terminates.

Above, if a modify/edit operation is accepted from a user, the writing restriction information of the RAM 103 is referred to, and if a writing restriction is enabled, a warning screen is displayed. However, another configuration may be used if it is a configuration that restricts so that modification of the setting value on the setting screen is disabled. For example, when displaying the setting screen of FIG. 3B on the operation panel 110 in accordance with a user instruction from the main menu screen, the CPU 102 may refer to the writing restriction information of the RAM 103, and perform display control such as displaying as gray or making accepting disabled for items or setting values that require a writing restriction.

As described above, according to this embodiment, it is possible to reduce a capacity of data stored in the ROM 104, and also perform writing control of a security policy without connecting to a server at activation time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-204676, filed Oct. 16, 2015, which is hereby incorporated by reference herein in its entirety.

What is claimed is:

1. An information processing apparatus, comprising:
    a ROM (read only memory) configured to store information about one or more security policies of the information processing apparatus and information indicating whether each of the one or more security policies is enabled, wherein the information about each of the one or more security policies includes one or more setting items of the information processing apparatus received from an external server, the one or more setting items having one or more setting values;
    a generation unit configured to generate, when the information processing apparatus is activated, restriction information for restricting modification of the one or more setting values of the one or more setting items associated with a security policy enabled based on the information indicating whether each of the one or more security policies is enabled;
    a RAM (random access memory) configured to store the restriction information generated by the generation unit;
    an acceptance unit configured to accept modification of the one or more setting values for the one or more setting items; and
    a restricting unit configured to restrict modification of the one or more setting values stored in the ROM based on the restriction information stored in the RAM,
    wherein the restricting unit controls the acceptance unit to make it prohibited to accept modification of the one or more setting values for the one or more setting items based on the restriction information stored in the RAM,
    wherein the restriction information generated by the generation unit is not stored in the ROM, and
    wherein at least one of the generation unit and the restricting unit is implemented by a processor and a memory.

2. The information processing apparatus according to claim 1, wherein
    the generation unit generates the restriction information at an activation time of the information processing apparatus.

3. The information processing apparatus according to claim 1, wherein the restricting unit causes a display unit to display a warning screen indicating that the one or more setting values of the information processing apparatus has modification disabled.

4. The information processing apparatus according to claim 1, further comprising
    an obtaining unit configured to obtain modification of the security policy, and
    an update unit configured to update the restriction information stored in the RAM in accordance with the modification obtained by the obtaining unit.

5. The information processing apparatus according to claim 1, wherein the information processing apparatus is an image forming apparatus having an image forming function.

6. An information processing method executed in an information processing apparatus, the method comprising:
    storing, in a ROM (read only memory), information about one or more security policies of the information processing apparatus and information indicating whether each of the one or more security policies is enabled, wherein the information about each of the one or more security policies includes one or more setting items of the information processing apparatus received from an external server, the one or more setting items having one or more setting values;
    generating, when the information processing apparatus is activated, restriction information for restricting modification of the one or more setting values of the one or more setting items associated with a security policy enabled based on the information indicating whether each of the one or more security policies is enabled;
    storing the generated restriction information in a RAM (random access memory) and not storing the generated restriction information in the ROM;
    accepting modification of the one or more setting values for the one or more setting items; and
    restricting modification of the one or more setting values stored in the ROM-based on the restriction information stored in the RAM,
    wherein the restricting controls the accepting to make it prohibited to accept modification of the one or more setting values for the one or more setting items based on the restriction information stored in the RAM.

7. A non-transitory computer-readable storage medium storing a program for causing a computer to function as an information processing apparatus that performs:
    storing, in a ROM (read only memory), information about one or more security policies of the information processing apparatus and information indicating whether each of the one or more security policies is enabled, wherein the information about each of the one or more security policies includes one or more setting items of the information processing apparatus received from an external server, the one or more setting items having one or more setting values;
    generating, when the information processing apparatus is activated, restriction information for restricting modification of the one or more setting values of the one or more setting items associated with a security policy enabled based on the information indicating whether each of the one or more security policies is enabled;
    storing the generated restriction information in a RAM (random access memory) and not storing the generated restriction information in the ROM;
    accepting modification of the one or more setting values for the one or more setting items; and
    restricting modification of the one or more setting values stored in the ROM based on the restriction information stored in the RAM,
    wherein the restricting controls the accepting to make it prohibited to accept modification of the one or more setting values for the one or more setting items based on the restriction information stored in the RAM.

8. The information processing apparatus according to claim 1, wherein the one or more setting items of the information processing apparatus is at least one of "SSL usage", "raw port", or "http usage".

9. The method according to claim 6, wherein the one or more setting items of the information processing apparatus is at least one of "SSL usage", "raw port", or "http usage".

* * * * *